(12) United States Patent
Chou

(10) Patent No.: US 7,388,575 B2
(45) Date of Patent: Jun. 17, 2008

(54) MECHANICAL WHEEL INSTRUCTION APPARATUS

(75) Inventor: Chin-Wen Chou, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 856 days.

(21) Appl. No.: 10/913,472

(22) Filed: Aug. 9, 2004

(65) Prior Publication Data

US 2006/0028448 A1 Feb. 9, 2006

(51) Int. Cl.
*G09G 5/08* (2006.01)
(52) U.S. Cl. ...................... 345/164; 345/167; 345/163
(58) Field of Classification Search ................ 345/163, 345/164, 167
See application file for complete search history.

(56) References Cited

U.S. PATENT DOCUMENTS

| | | | | |
|---|---|---|---|---|
| 5,808,568 | A | * | 9/1998 | Wu .............................. 341/20 |
| 5,912,661 | A | * | 6/1999 | Siddiqui ..................... 345/166 |
| 6,188,389 | B1 | | 2/2001 | Yen |
| 6,188,393 | B1 | * | 2/2001 | Shu ............................. 345/184 |
| 6,285,355 | B1 | * | 9/2001 | Chang ........................ 345/163 |
| 7,170,493 | B2 | * | 1/2007 | Lu .............................. 345/163 |

* cited by examiner

*Primary Examiner*—Kent Chang
(74) *Attorney, Agent, or Firm*—Muncy, Geissler, Olds & Lowe, PLLC

(57) ABSTRACT

A mechanical wheel instruction apparatus to replace the conventional wheel structure that uses a grating switch to output signal. The invention has a mechanical conductive terminal set to output instruction signals when become conductive. The apparatus of the invention has a wheel which has a rotation side with convex sections located on the perimeter in an equally spaced manner. Every two neighboring convex sections are interposed by a concave section. A base board is provided to electrically connect to a contact leg assembly which has a forward contact leg and a reverse contact leg located on the convex sections and a common contact leg located on the concave section. When the wheel is subject to a force and rotates, the convex section pushes the forward contact leg and the reverse contact leg to contact the common contact leg to output a forward rotation instruction and a reverse rotation instruction. The invention may be fabricated at a lower cost than the grating switch and save installation space.

12 Claims, 13 Drawing Sheets

MECHANICAL WHEEL INSTRUCTION APPARATUS

FIELD OF THE INVENTION

The present invention relates to a mechanical wheel instruction apparatus and particularly to a wheel apparatus adopted for use on electronic devices such as mouses, remote control devices or keyboards to output different instruction signals.

BACKGROUND OF THE INVENTION

Many electronic devices such as mouses, remote control devices or keyboards have a left and a right function keys to facilitate browsing of documents, searching of Web pages and zooming of images. In addition, there is a wheel located between the left and the right function keys to output signals during rotation. The operation principle of the wheel is briefed as follow:

Referring to FIG. 1 for a conventional wheel design used in mouses, it has an anchor seat 10 to support a wheel 20. There is an inductive photoelectric switch 12 located below the axle 11. The wheel 20 has a rotation side 22 on a lateral side that has apertures 21 formed thereon in an evenly spaced manner (or as shown in FIG. 2, an axle 11 is connected to a grating switch 15). When the wheel 20 rotates, the apertures 21 break or connect the inductive photoelectric switch 12 to generate different instruction signal outputs. Besides the instruction signal outputs caused by the rotation of the wheel 20, there is a button switch 13 beneath the wheel 20 that allows users to leave the functional window preset by the software to execute other instructions when the button switch 13 is subject to compression from the wheel 20. As the axle 11 and the grating switch 15 usually are fixedly mounted, the downward displacement of the wheel 20 has to take into account of the grating switch 15. This makes design of the wheel 20 more difficult. Moreover, the grating switch 15 or the inductive photoelectric switch 12 is more expensive. Adopted for small mouse, the design of the grating switch 15 or the inductive photoelectric switch 12 is even more complicated.

In addition, rotation of the wheel 20 has to consider the rotation touch sense of users. As shown in FIG. 1, the rotation touch sense is obtained through a rotation end 111 of the axle 11 that has teeth to evenly divide the perimeter of one end of the axle 11. The rotation end 111 is coupled with an elastic reed 14 which bounds over the teeth while the rotation end 111 is rotating to provide the touch sense to users. Such a design increases the cost and makes space design more difficult. Moreover, the rotation end 111 is spaced from the wheel 20 at some distance. The rotation feeling transmitted to the hand of users is not satisfactory.

To meet the trend of electronic products that demands lean and light, U.S. Pat. No. 6,188,389 discloses a mouse structure which has three D shafts input. It mainly includes a main anchor seat, a secondary anchor seat, a rubber wheel, a grating wheel, a suspender and an idle roller. The grating switch is embedded inside between the wheels to shrink the space. It still has the high cost problem of the grating switch. Adopted on small mouses and with the smaller wheels, fabrication of the grating switch is even more difficult.

SUMMARY OF THE INVENTION

Therefore the primary object of the present invention is to resolve the aforesaid disadvantages. The present invention aims to overcome the high fabrication cost and small size fabrication difficulty occurred to the conventional grating switch or inductive photoelectric switch. The invention adopts a simpler mechanical conductive terminal set that forms contact to output instruction signals. The structure may be fabricated at a lower cost, is easier to assemble and has a simpler design.

In one aspect, the invention includes a wheel instruction apparatus that has a wheel with convex sections equally spaced on the perimeter of a rotation surface. Every two neighboring convex a concave section interposes sections. A base board is electrically connected to a contact leg assembly that includes a forward contact leg, a reverse contact leg and a common contact leg located respectively on the convex and concave sections. When the wheel rotates under forces, the convex sections drive the forward contact leg, reverse contact leg and common contact leg to connect with each other and output forward and reverse rotation instructions. The fabrication cost is lower than that of the grating switch, and the installation space is smaller.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
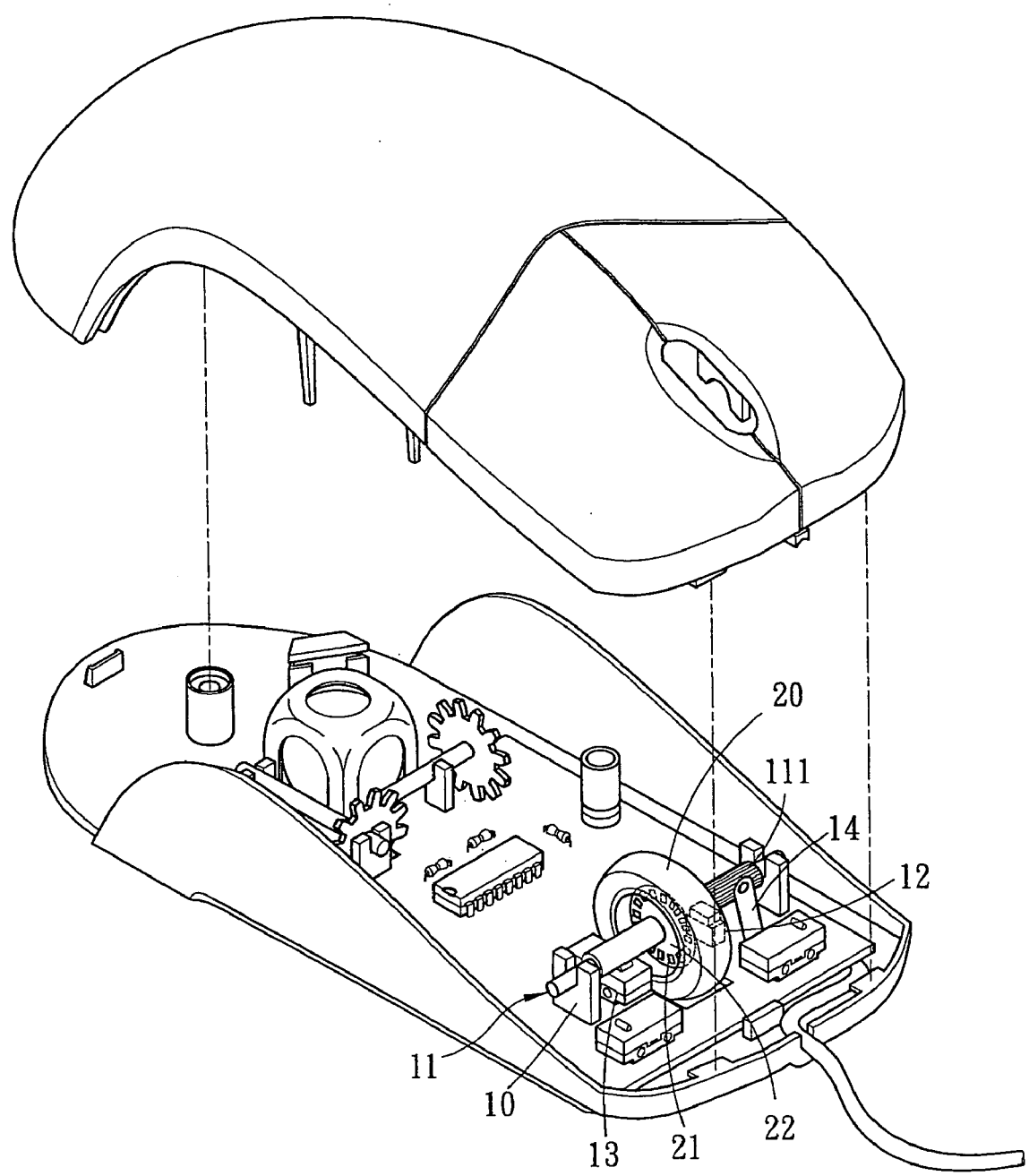
FIG. 1 is a perspective view of a conventional design for a mouse.
Figure 2:
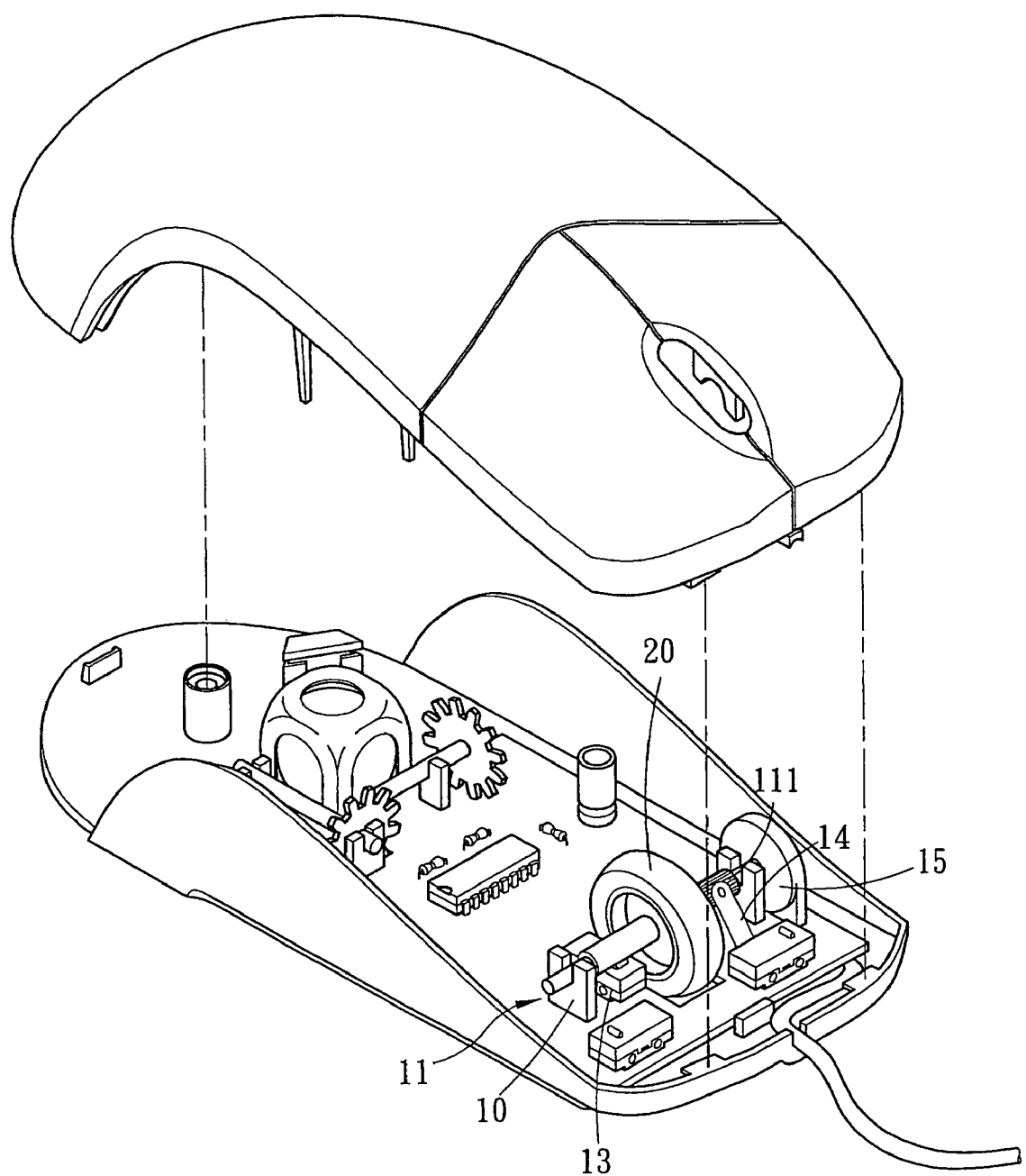
FIG. 2 is a perspective view of another conventional design for a mouse.
Figure 3:
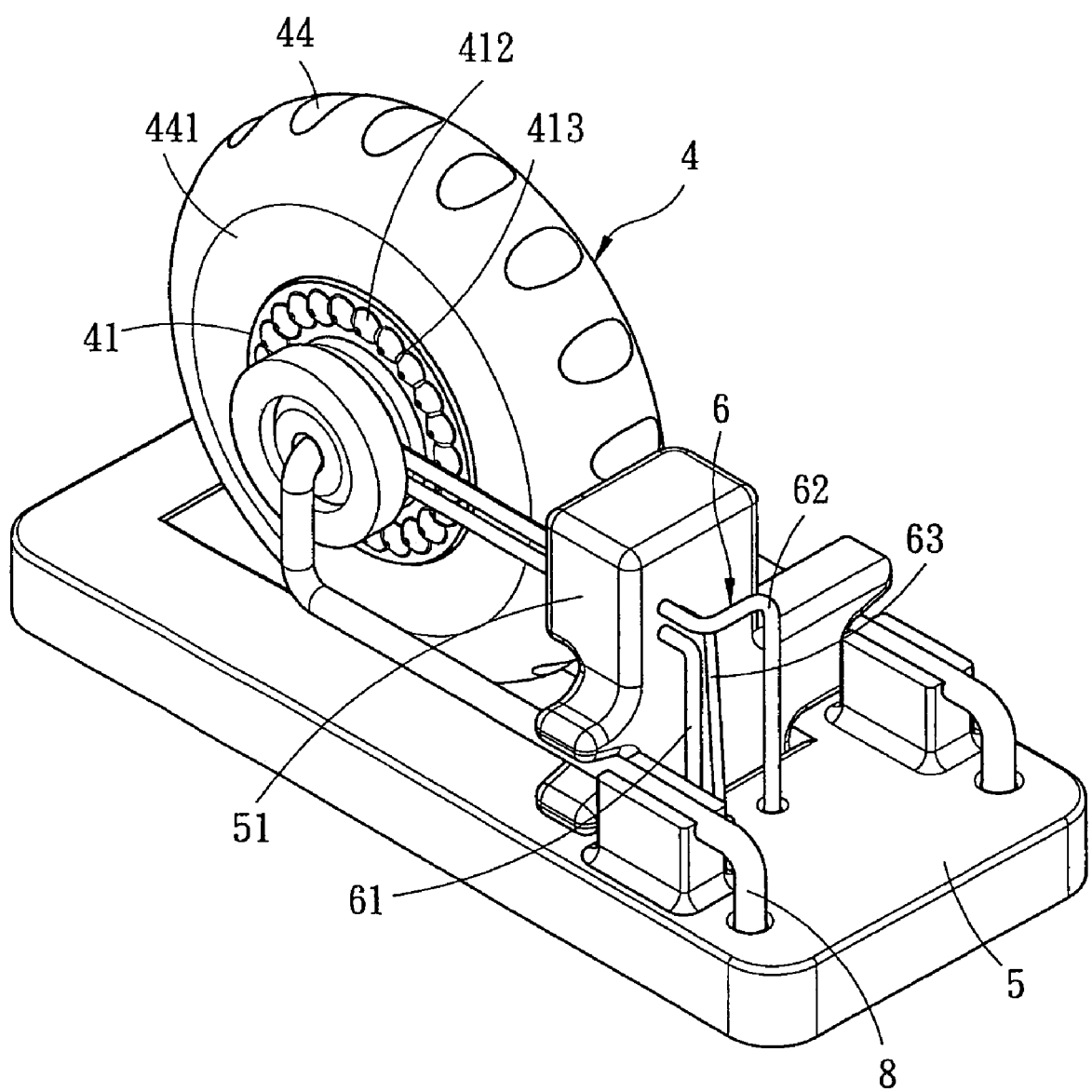
FIG. 3 is a perspective view of the present invention.
Figure 4:
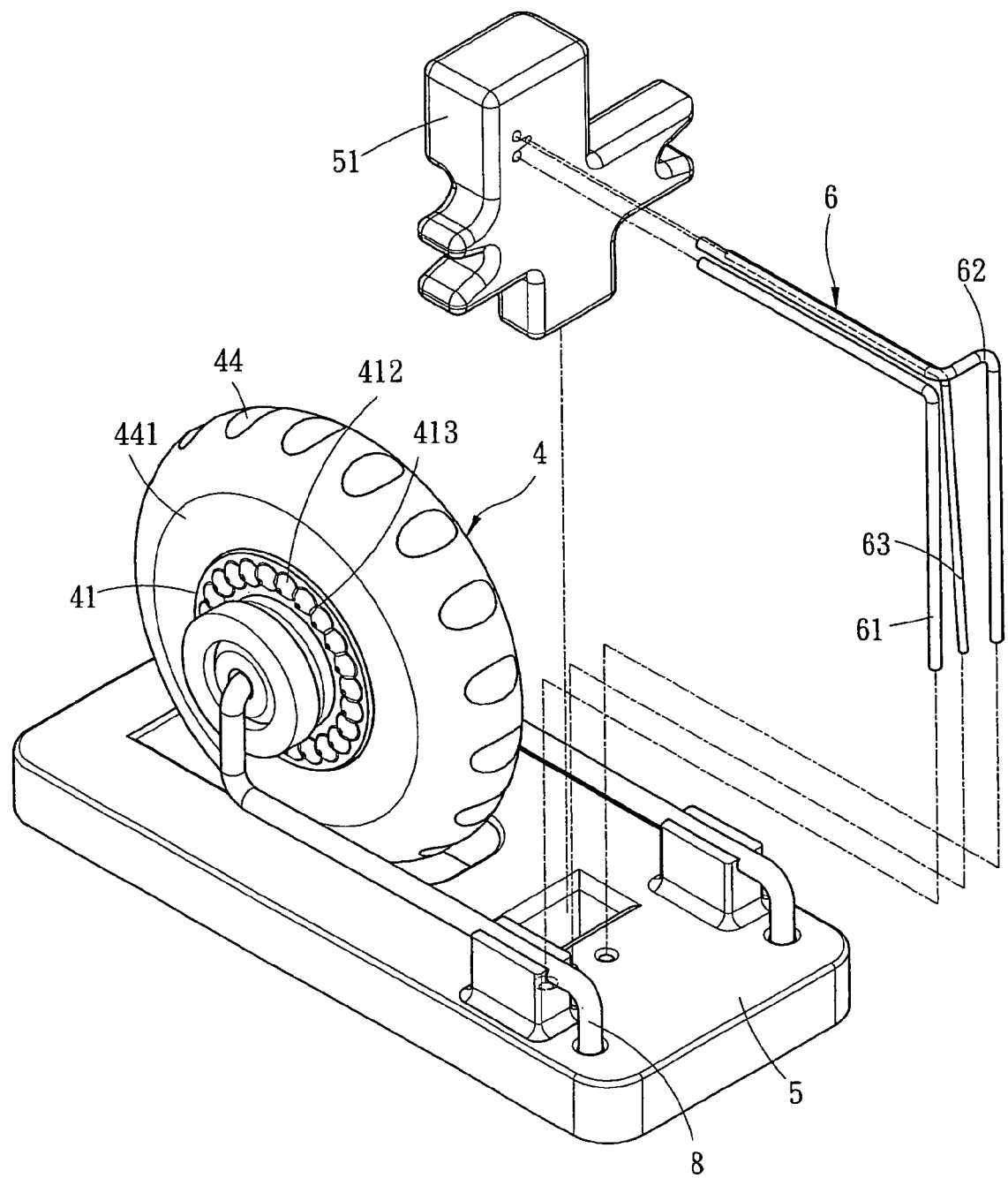
FIG. 4 is an exploded view of the present invention.
Figure 10:
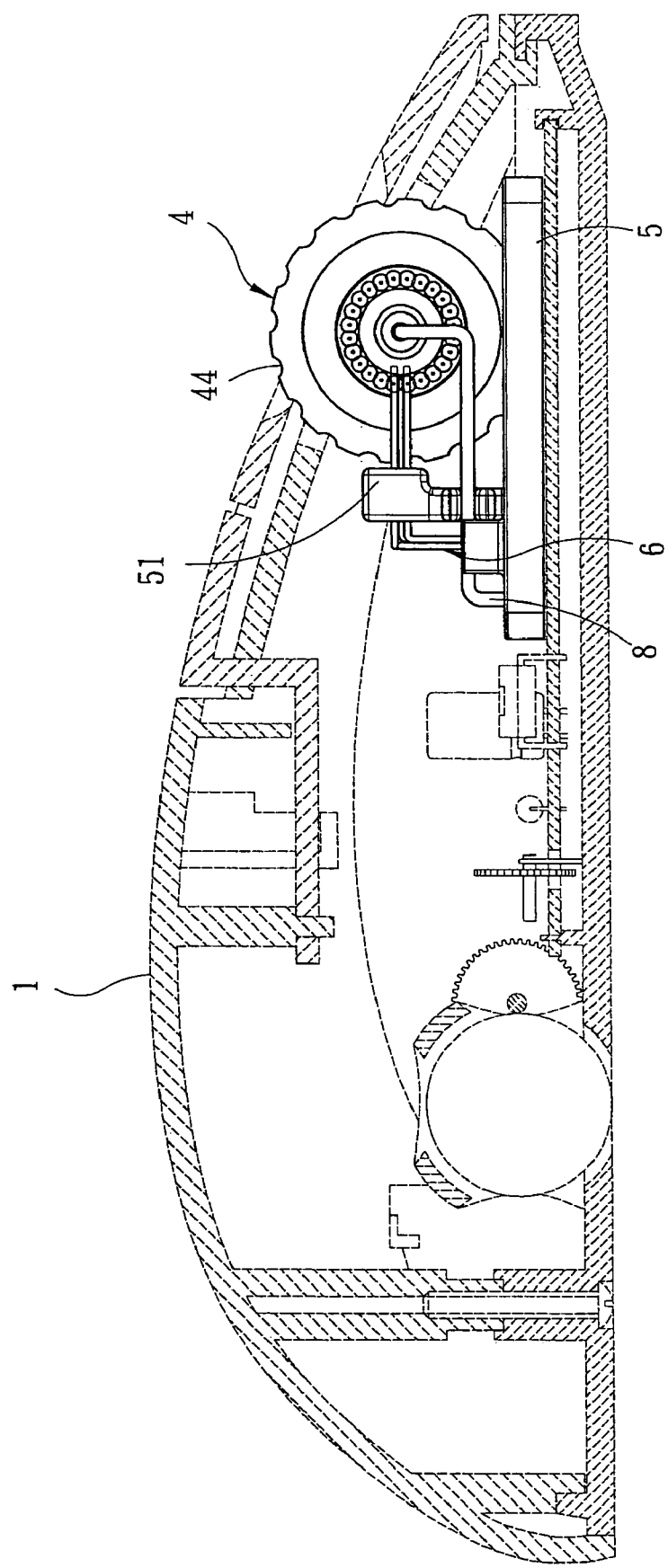
FIG. 10 is a schematic view of an embodiment of the invention adopted on a mouse.
Figure 11:
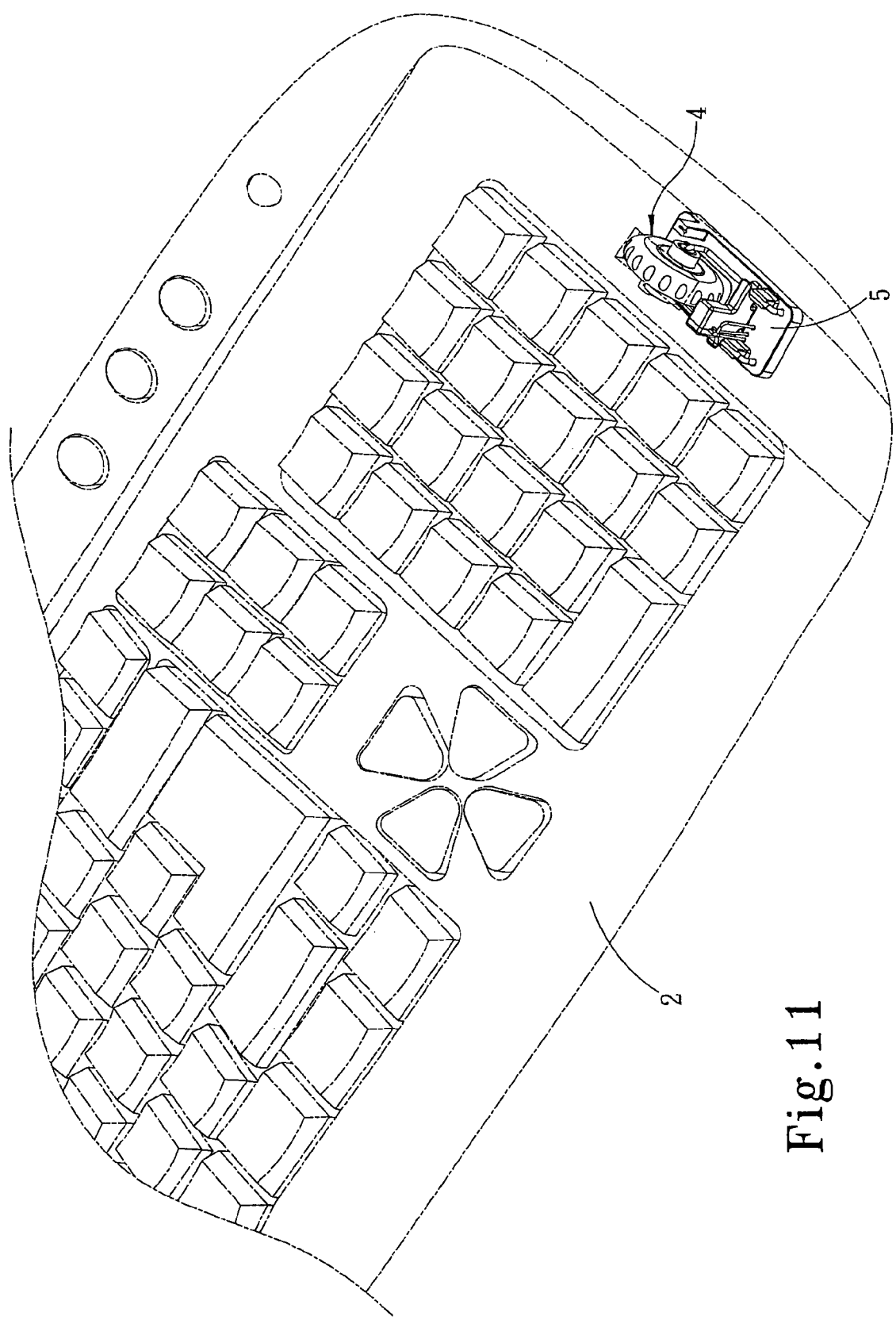
FIG. 11 is a schematic view of an embodiment of the invention adopted on a keyboard.
Figure 12:
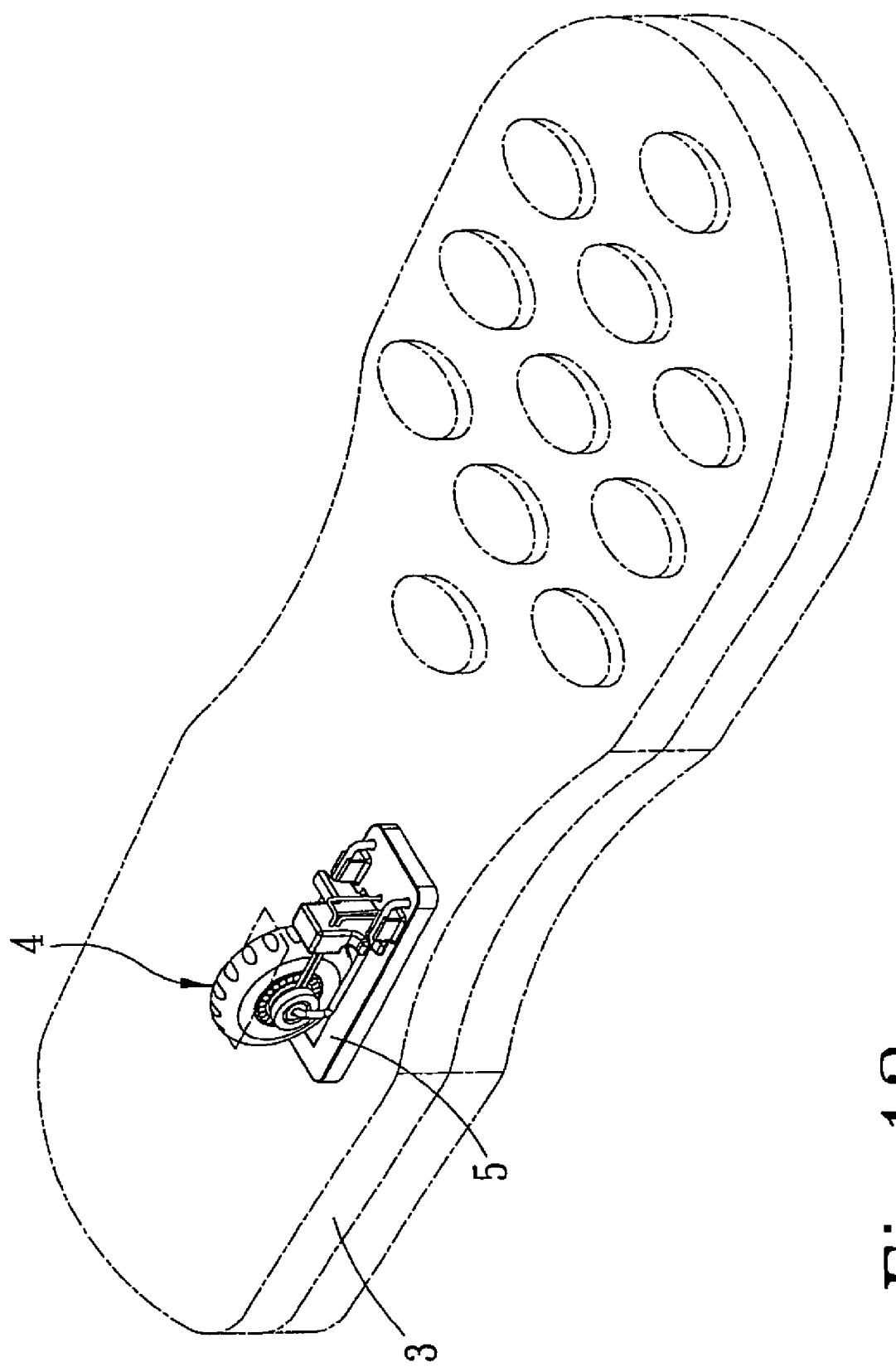
FIG. 12 is a schematic view of an embodiment of the invention adopted on a remote control device.

Please referring to FIGS. 3 and 4, the mechanical wheel instruction apparatus according to the present invention is adopted for use on electronic products such as a mouse 1 (referring to FIG. 10), a keyboard 2 (referring to FIG. 11) or a remote control device 3 (referring to FIG. 12) to output different instruction signals. It includes a wheel 4 and a base board 5 to generate instruction signals corresponding to rotation of the wheel 4.

Figure 5A:
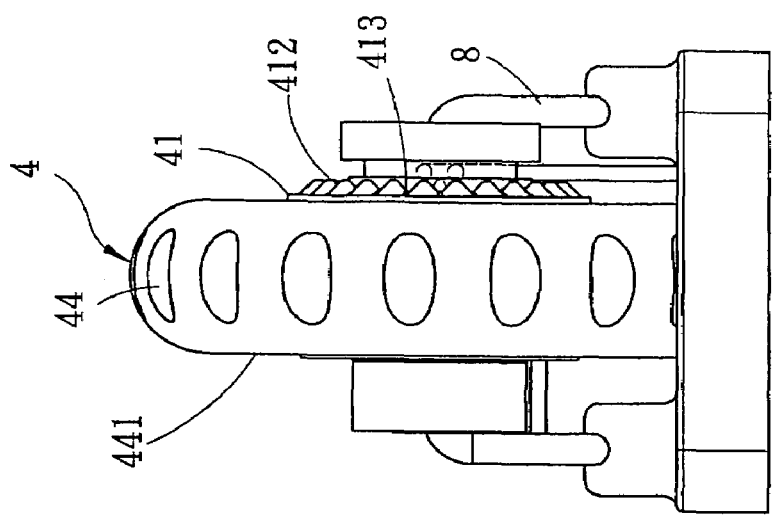
FIG. 5A is a front view of the present invention.
Figure 5B:
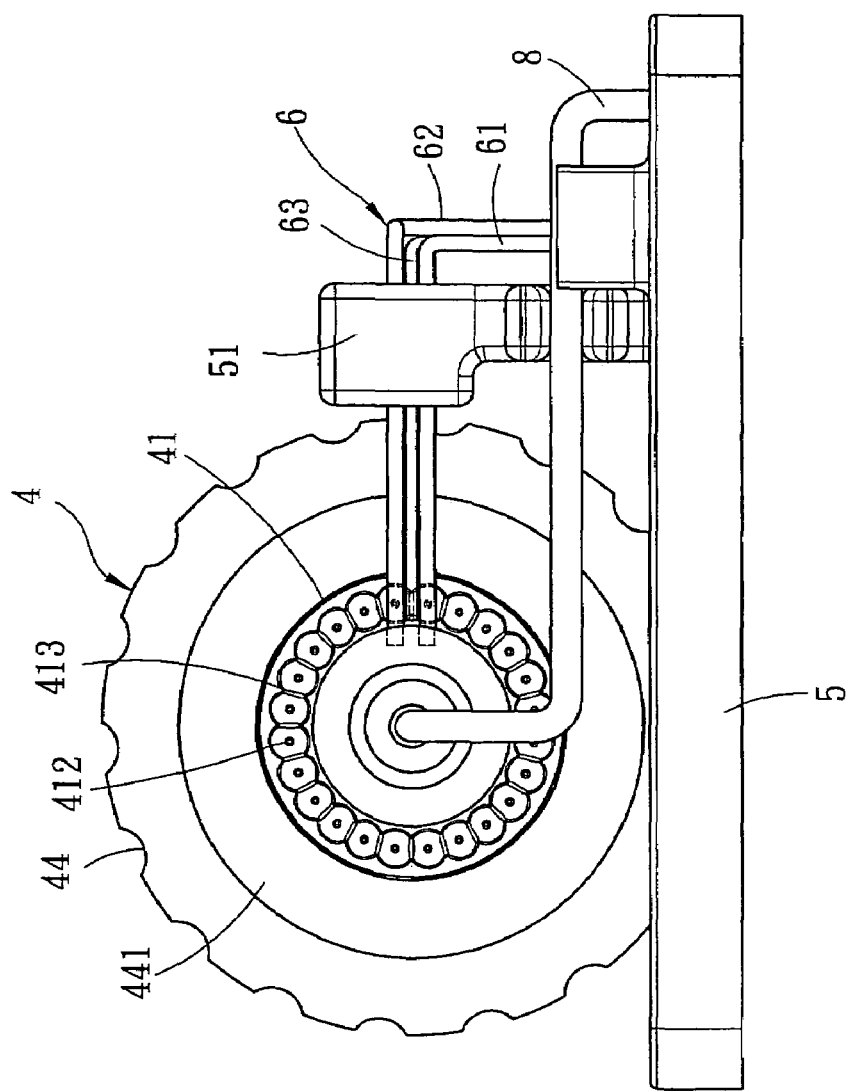
FIG. 5B is a side view of the present invention.
Figure 9:
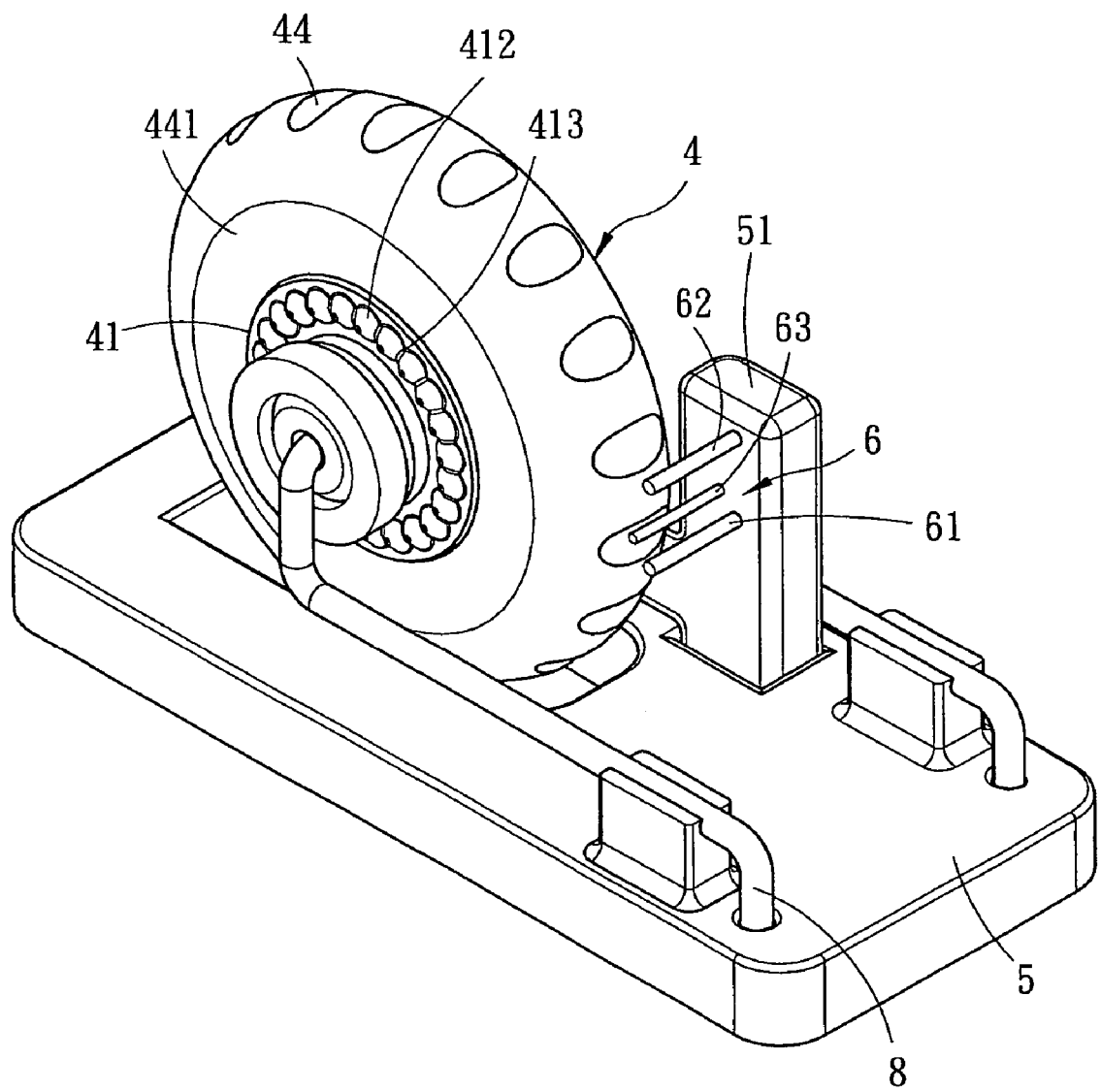
FIG. 9 is a schematic view of another embodiment of the invention.

Also referring to FIGS. 5A and 5B, the wheel 4 has a rotation side 41 which has convex sections 412 located on the perimeter in an equally spaced manner. A concave section 413 interposes every two neighboring convex sections 412 such that the convex section 412 and the concave sections 413 are formed alternately on the perimeter of the rotation side 41 in an equally spaced manner. Every two neighboring convex section 412 and concave section 413 are bridged by a slant guiding surface 43 (referring to FIG. 6A), or an arched guiding surface 42 as shown in FIG. 7. The wheel 4 has a force applying side 44 to receive user's contact and force, and two lateral sides 441 on two sides of the force applying side 44. As shown in FIG. 3, the rotation side 41 may be on the lateral side 441, or on the force applying side 44 as shown in FIG. 9. They all function based on the same principle. The following discussion is based on an example which has the rotation side 41 located on the lateral side 441.

The base board 5 is electrically connected to a contact leg assembly 6 which includes a forward contact leg 61 and a reverse contact leg 62 located on the convex sections 412, and a common contact leg 63 located on the concave section 413 between the forward contact leg 61 and the reverse contact leg 62. The base board 5 further has a bracing member 51 to anchor the contact leg assembly 6, and a bracket 8 running through the center of the wheel 4 to serve as the axle thereof (the base board 5 may also be a simple support board and a circuit board with an instruction signal circuit may be located beneath the base board 5).

Figure 6A:
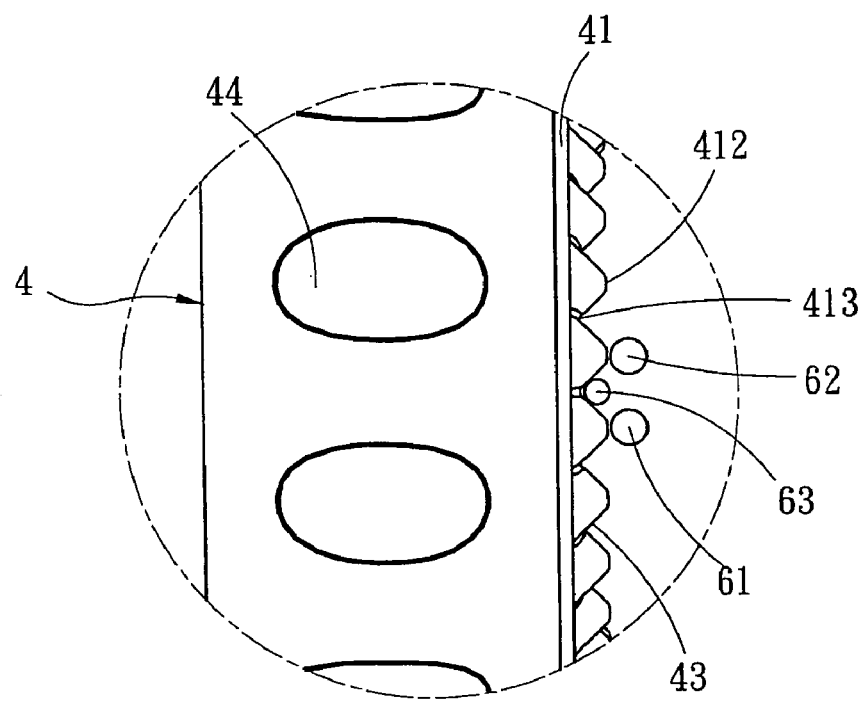
FIGS. 6A, 6B and 6C are schematic views of the invention in operating conditions.
Figure 6B:
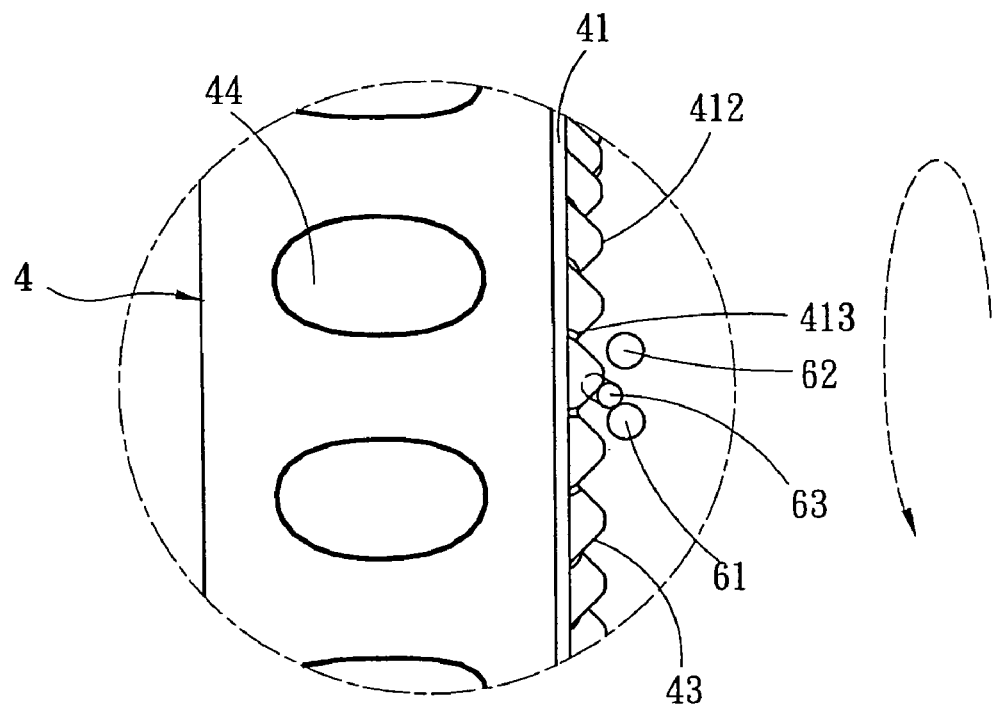
Figure 6C:
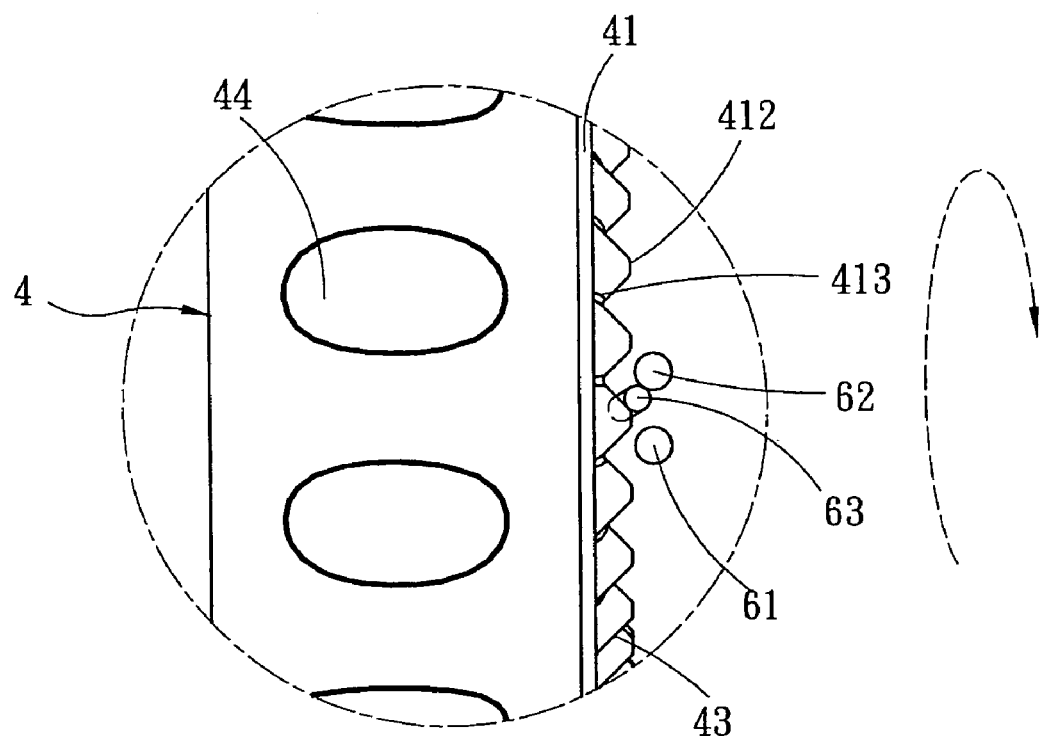
Figure 7:
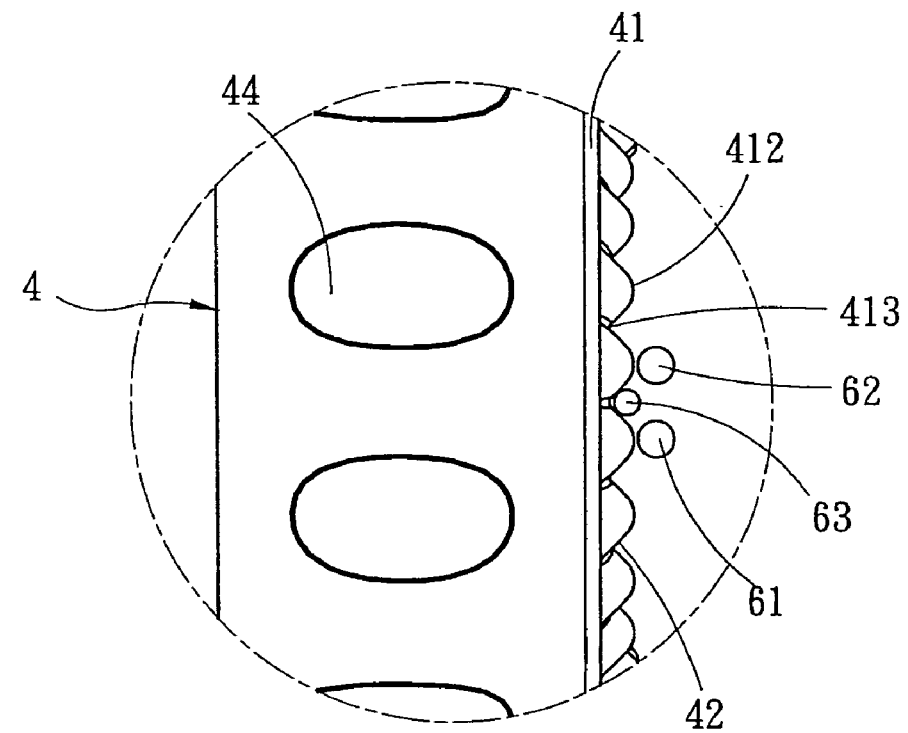
FIG. 7 is a schematic view of the invention showing the convex and concave sections interposed by an arched guiding surface.

Referring to FIGS. 6A, 6B and 6C, when in use, a user exerts a force on the force applying surface 44 of the wheel 4 to rotate the wheel 4 in the clockwise direction, the common contact leg 63 is pushed by the slant guiding surface 43 of a upper convex section 412 to contact the forward contact leg 61 and output a forward rotation instruction. Once the peak of the upper convex section 412 passes over the forward contact leg 61, the pushing force of the slant guiding surface 43 to the common contact leg 63 releases, the common contact leg 63 moves away from the forward contact leg 61 and breaks the conductive contact condition, and returns to the valley of the a upper concave section 413. On the contrary, when the wheel 4 is subject to a force and rotates in the counterclockwise direction, the common contact leg 63 is pushed by the slant guiding surface 43 of a lower convex section 412 to contact the reverse contact leg 62 and output a reverse rotation instruction. Once the peak of the lower convex section 412 passes over the reverse contact leg 62, the pushing force of the slant guiding surface 43 to the common contact leg 63 releases, the common contact leg 63 moves away from the reverse contact leg 62 and breaks the conductive contact condition, and returns to the valley of a lower concave section 413.

The forward rotation instruction and the reverse rotation instruction may be defined as the forward scroll or rearward scroll function in the present software environment. However, users may define the software environment themselves as desired. This is not the feature of the invention, details are omitted.

While the common contact leg 63 is pushed by the slant guiding surface 43, in addition to generating the instruction signal, the common contact leg 63 also slides over the convex section 412 and the concave section 413 alternately, hence a noticeable rotation movement is transmitted to user's hand to provide a desired touch sense to enable the user to feel the rotation degree and position.

Figure 8A:
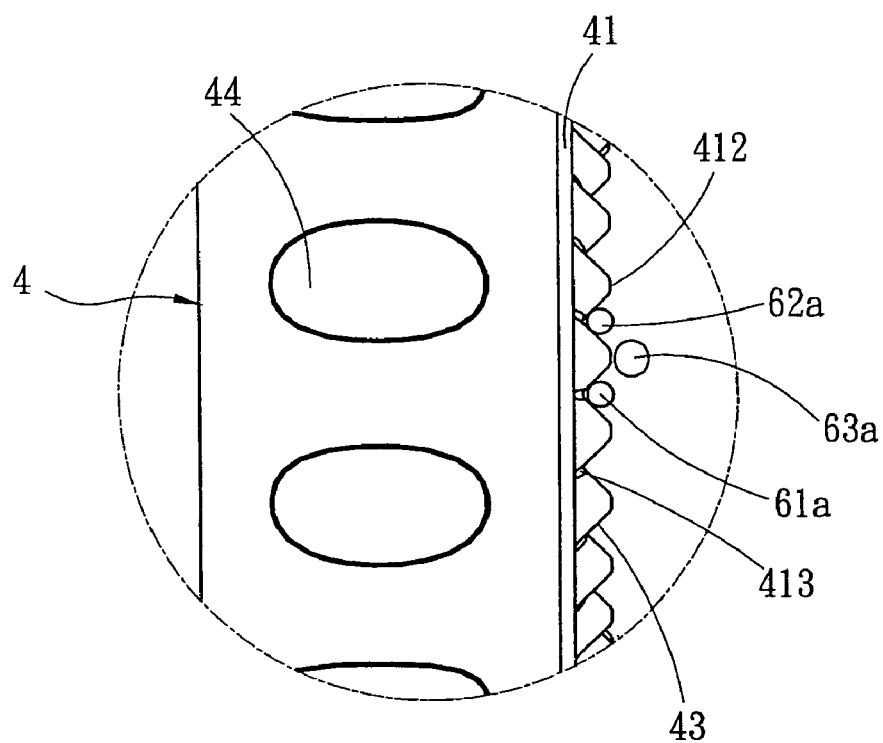
FIGS. 8A, 8B and 8C are schematic views of another embodiment of the invention in operating conditions.
Figure 8B:
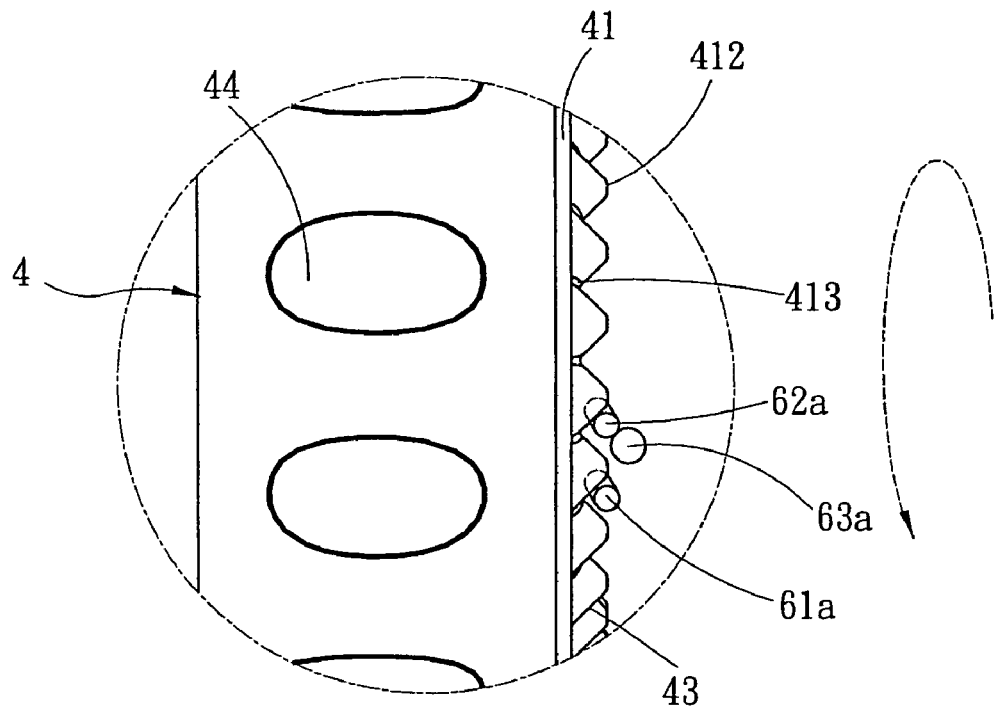
Figure 8C:
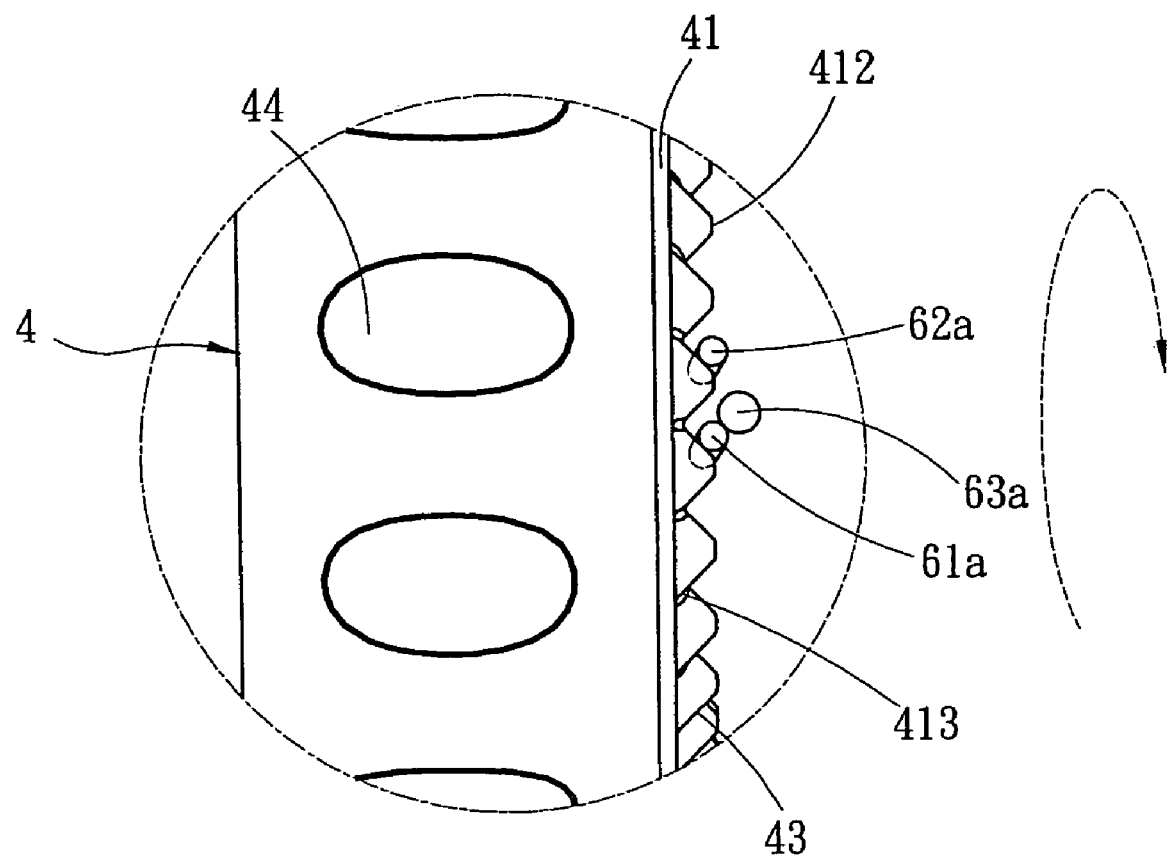

Refer to FIGS. 8A, 8B and 8C for another embodiment of the invention. It differs from the previous one by having the common contact leg 63, forward contact leg 61 and reverse contact leg 62 located on different positions. In this embodiment, the common contact leg 63a is located on the convex section 412, while the forward contact leg 61a and the reverse contact leg 62a are located on a upper and a lower concave sections 413. Its operation principle is same as the one previously discussed. When the wheel 4 is subject to a force and rotates clockwise, the forward contact leg 61a is pushed by the slant guiding surface 43 of a upper convex section 412 to contact the common contact leg 63 and output a forward rotation instruction. On the contrary, when the wheel 4 is subject to a force and rotates counterclockwise, the reverse contact leg 62a is pushed by the slant guiding surface 43 of a lower convex section 412 to contact the common contact leg 63 and output a reverse rotation instruction.

What is claimed is:

1. A mechanical wheel instruction apparatus, comprising:
   a wheel having a rotation side, convex sections located on the perimeter of the rotation side in an equally spaced manner, every two neighboring convex sections being interposed by a concave section; and
   a base board for generating instruction signals corresponding to rotation of the wheel being electrically connected to a contact leg assembly which includes a forward contact leg and a reverse contact leg located on the convex sections and a common contact leg located on the concave section between the forward contact leg and the reverse contact leg;
   wherein the common contact leg is pushed by a upper convex section to contact the forward contact leg to output a forward rotation instruction when the wheel is subject to a force and rotates clockwise, and the common contact leg is pushed by a lower convex section to contact the reverse contact leg to output a reverse rotation instruction when the wheel is subject to a force and rotates counterclockwise.

2. The mechanical wheel instruction apparatus of claim 1, wherein the wheel has a force applying surface and two lateral sides on two sides of the force applying surface, the rotation side being located on the lateral side.

3. The mechanical wheel instruction apparatus of claim 1, wherein the wheel has a force applying surface and two lateral sides on two sides of the force applying surface, the rotation side being located on the force applying surface.

4. The mechanical wheel instruction apparatus of claim 1, wherein the convex section and the concave section are bridged by an arched guiding surface.

5. The mechanical wheel instruction apparatus of claim 1, wherein the convex section and the concave section are bridged by a slant guiding surface.

6. The mechanical wheel instruction apparatus of claim 1, wherein the base board has a bracing member to anchor the contact leg assembly.

7. A mechanical wheel instruction apparatus, comprising:
   a wheel having a rotation side, convex sections located on the perimeter of the rotation side in an equally spaced manner, every two neighboring convex sections being interposed by a concave section; and
   a base board electrically connected to a contact leg assembly which has a common contact leg located on the convex section and a forward contact leg and a reverse contact leg located respectively a upper concave section and a lower concave section abutting the convex section;
   wherein the forward contact leg is pushed by a upper convex section to contact the common contact leg to output a forward rotation instruction when the wheel is subject to a force and rotates clockwise, and the reverse contact leg is pushed by a lower convex section to contact the common contact leg to output a reverse rotation instruction when the wheel is subject to a force and rotates counterclockwise.

8. The mechanical wheel instruction apparatus of claim 7, wherein the wheel has a force applying surface and two lateral sides on two sides of the force applying surface, the rotation side being located on the lateral side.

9. The mechanical wheel instruction apparatus of claim 7, wherein the wheel has a force applying surface and two lateral sides on two sides of the force applying surface, the rotation side being located on the force applying surface.

10. The mechanical wheel instruction apparatus of claim 7, wherein the convex section and the concave section are bridged by an arched guiding surface.

11. The mechanical wheel instruction apparatus of claim 7, wherein the convex section and the concave section are bridged by a slant guiding surface.

12. The mechanical wheel instruction apparatus of claim 7, wherein the base board has a bracing member to anchor the contact leg assembly.

\* \* \* \* \*